United States Patent
Watanabe

(10) Patent No.: US 8,120,663 B2
(45) Date of Patent: Feb. 21, 2012

(54) IMAGE SENSING APPARATUS AND CORRECTION METHOD

(75) Inventor: Yoshinori Watanabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 384 days.

(21) Appl. No.: 12/472,866

(22) Filed: May 27, 2009

(65) Prior Publication Data

US 2009/0295981 A1 Dec. 3, 2009

(30) Foreign Application Priority Data

Jun. 3, 2008 (JP) .................................. 2008-146218

(51) Int. Cl.
 H04N 5/225 (2006.01)
 H04N 5/228 (2006.01)
(52) U.S. Cl. ................... 348/220.1; 348/222.1
(58) Field of Classification Search ................ 348/220.1
 See application file for complete search history.

(56) References Cited

U.S. PATENT DOCUMENTS

| 6,853,400 B1 * | 2/2005 | Matama | 348/96 |
| 6,862,373 B2 * | 3/2005 | Enomoto | 382/263 |
| 2008/0284869 A1 * | 11/2008 | Utsugi | 348/222.1 |

FOREIGN PATENT DOCUMENTS

| JP | 11-161773 | 6/1999 |
| JP | 2001-186533 | 7/2001 |

* cited by examiner

Primary Examiner — Jordan Schwartz
(74) Attorney, Agent, or Firm — Cowan, Liebowitz & Latman, P.C.

(57) ABSTRACT

An image sensing apparatus comprises an image sensor, a driving unit that drives the image sensor so as to output electrical signals through multiple readout modes including at least a full pixel readout mode and a thinning readout mode, an acquisition unit that acquires lens magnification chromatic aberration correction information, a correction coefficient calculation unit that obtains a coefficient for a first magnification chromatic aberration correction method during full pixel readout and a coefficient for a second magnification chromatic aberration correction method during thinning readout, and a digital signal processor that corrects the electrical signals using the obtained coefficients. In the second magnification chromatic aberration correction method, the thinned and read-out electrical signals are corrected based on positions in the image sensor of pixels corresponding to the electrical signals.

7 Claims, 13 Drawing Sheets

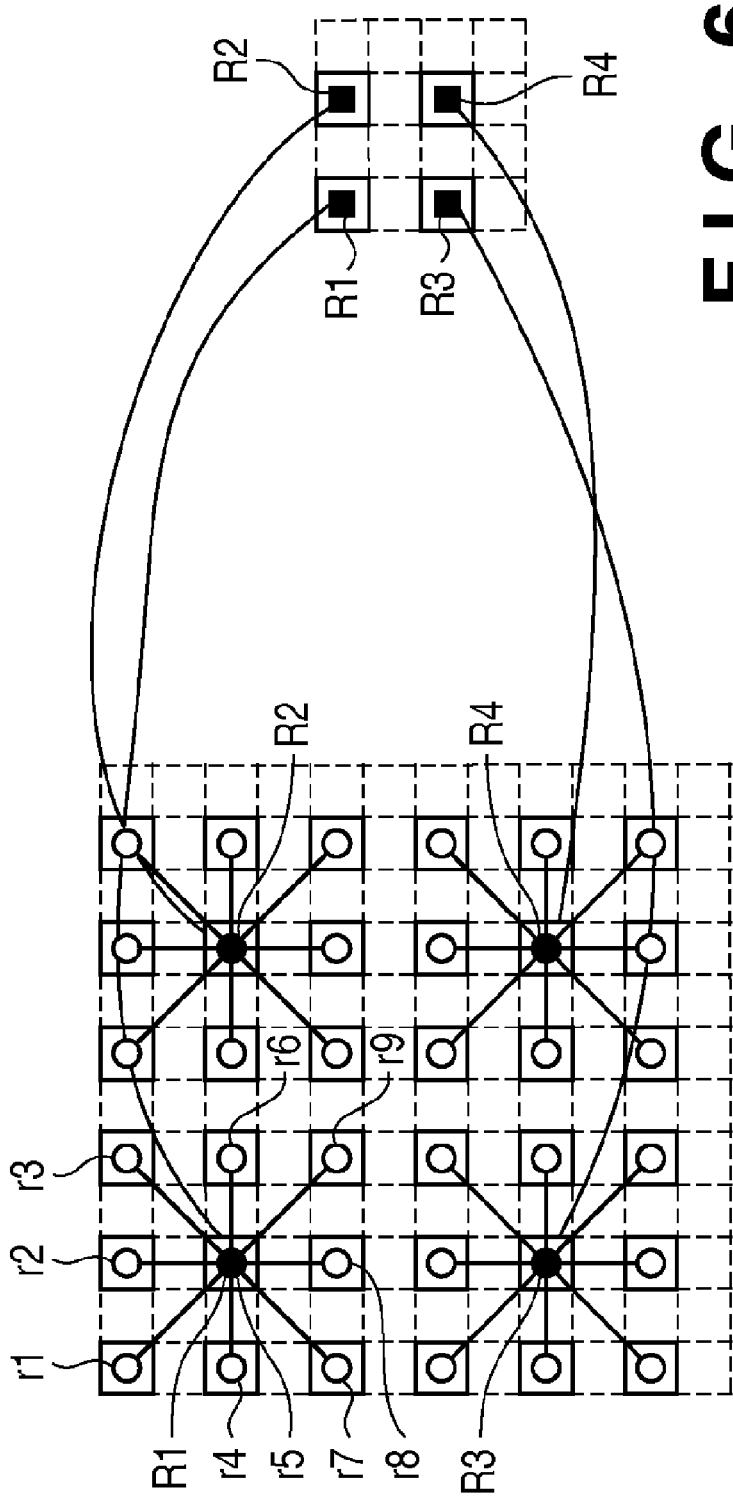

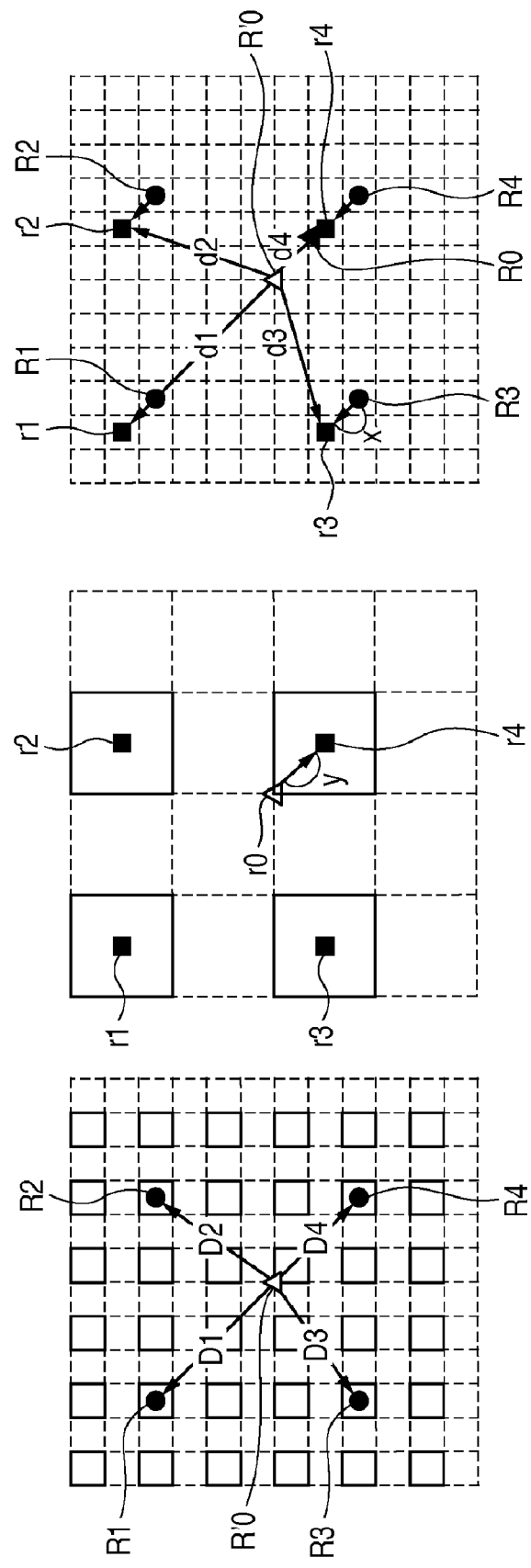

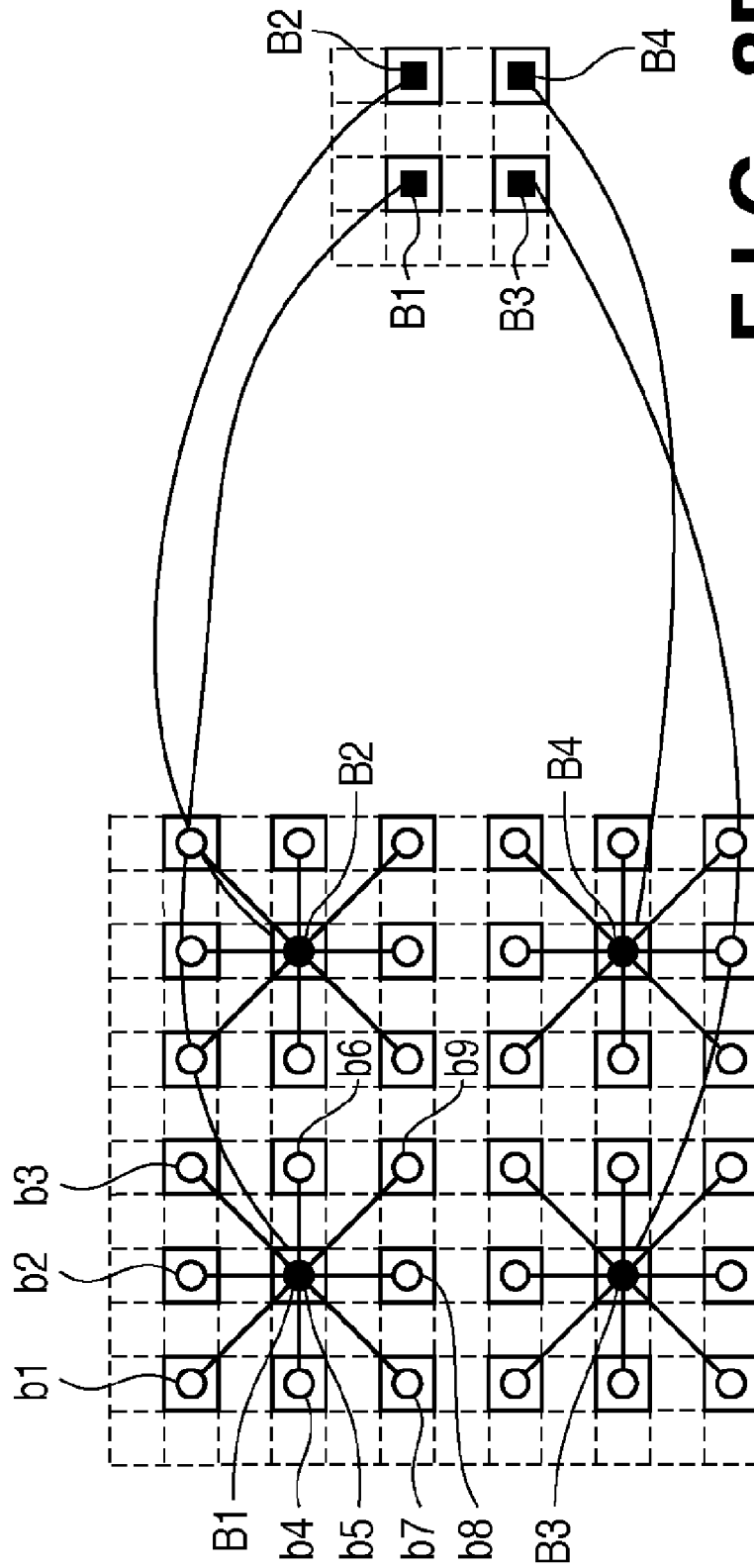

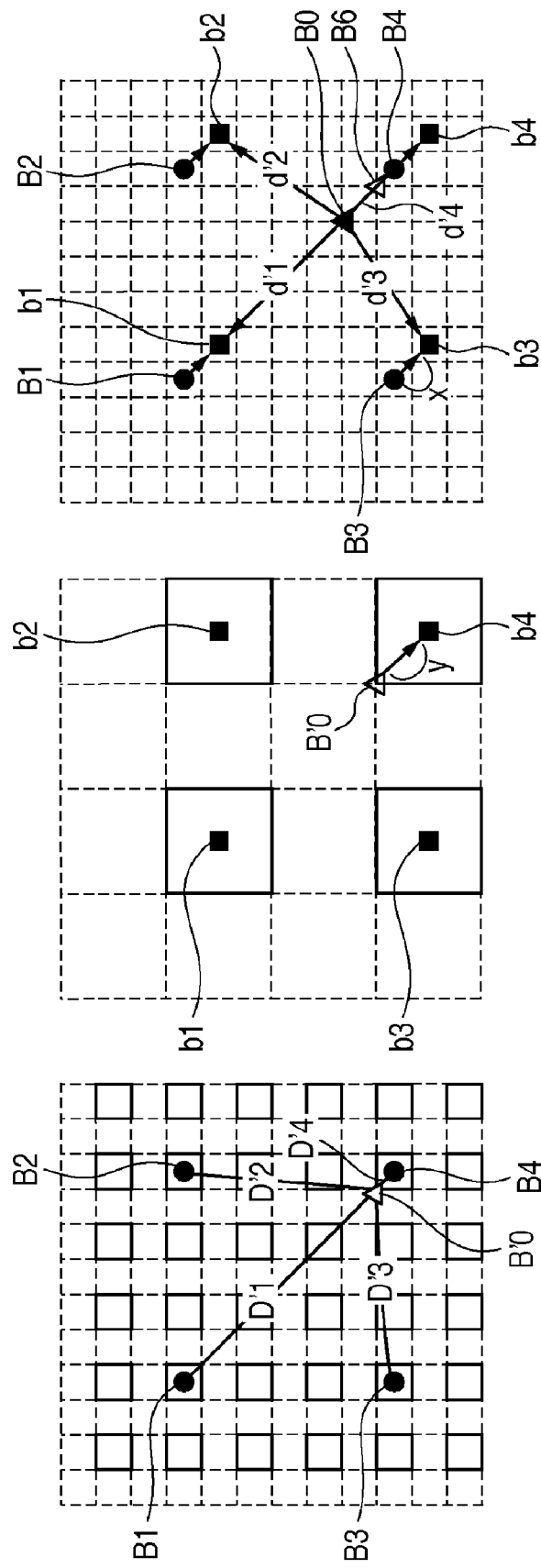

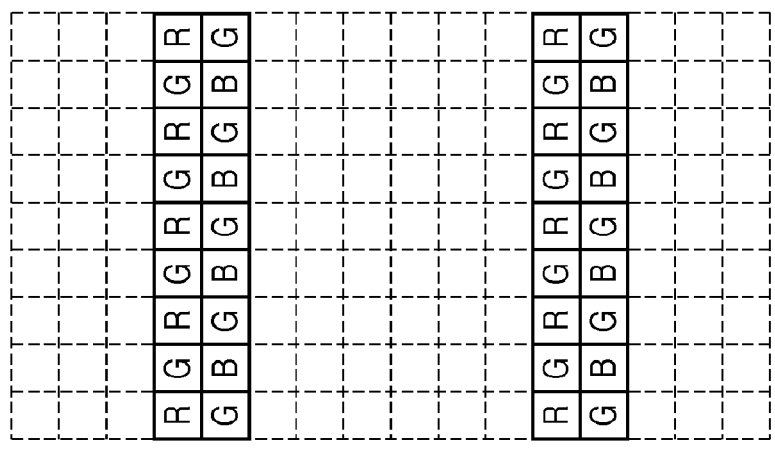
FIG. 14C
FIG. 14B
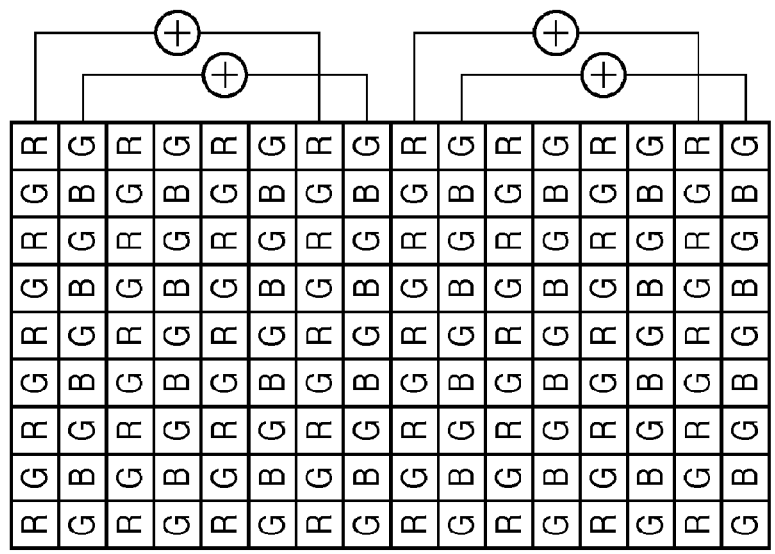
FIG. 14A

IMAGE SENSING APPARATUS AND CORRECTION METHOD

BACKGROUND OF THE INVENTION

1. Field of the Invention

The present invention relates to an image sensing apparatus and a magnification chromatic aberration correction method.

2. Description of the Related Art

Newer digital still cameras have seen an increase in the number of pixels used, with cameras now commercialized that have mega-pixel image sensors of 10 million or more pixels. In general, in a digital still camera equipped with a mega-pixel image sensor, operation of the image sensor during electronic viewfinder (EVF) display and during moving image sensing is such that, in order to increase the display rate, a driving method is adopted that thins the lines so that they match the number of display lines of the liquid crystal display apparatus. In addition, in order to obtain a sufficient value of pixel data when sensing during short exposure flashes, there is also a driving method that adds together adjacent pixels and reads them out.

One of the aberrations generated in the optical systems in these cameras (image sensing apparatuses) is magnification chromatic aberration. Chromatic aberration is caused by differences in refractive index due to wavelength, and since focal length differs with color with magnification chromatic aberration in particular, is a phenomenon in which the position of the image on the image plane (that is, the magnification) appears to shift with each color. Magnification chromatic aberration can be corrected to some extent by the material of the lens. However, in that case, because the material becomes expensive and so forth, the cost of manufacturing the lens also increases. For this reason, a number of methods that correct the magnification chromatic aberration using signal processing have been proposed.

For example, according to the art disclosed in Japanese Patent Laid-Open No. 11-161773, first, magnification chromatic aberration data for the lens for each color is written to a data storage area, and magnification correction by enlarging and reducing the image based on the magnification chromatic aberration data is carried out each time an image is obtained through that lens. Then, after magnification correction, the images of each color are synthesized into a single image, accomplishing magnification chromatic aberration correction.

In addition, in Japanese Patent Laid-Open No. 2001-186533, a technique of carrying out magnification chromatic aberration correction in an image sensor that receives light of three colors such as RGB at a single image sensor plane is disclosed. In this method, synchronization and magnification chromatic aberration correction of the image is carried out by obtaining an interpolation coefficient based on chromatic aberration correction information when interpolating missing color signals for the pixels for reproduction as image data.

However, Japanese Patent Laid-Open No. 11-161773 and Japanese Patent Laid-Open No. 2001-186533 do not take into consideration magnification chromatic aberration correction in a case in which the image sensor is read out in different modes, such as a thinning readout mode and a pixel addition mode.

FIGS. 4A through 4C are diagrams illustrating a pixel arrangement in a case in which image data is read out in a thinning readout mode during EVF display and moving image sensing. FIG. 4A shows the pixel arrangement in the image sensor, FIG. 4B shows the pixel arrangement on the image sensor of image data read out in the thinning readout mode, and FIG. 4C shows the pixel arrangement in a state in which the image data read out in the thinning readout mode is stored in a memory or the like. As can be seen from FIGS. 4A-4C, the pixel arrangement of image data read out in the thinning readout mode (FIG. 4C) is different from the pixel arrangement in the image sensor (FIG. 4B). As a result, if magnification chromatic aberration correction is carried out on the image data that is read out in the thinning readout mode without taking into consideration this difference in position of the pixel arrangements, conversely the image quality deteriorates.

FIGS. 14A through 14C are diagrams illustrating pixel arrangements in a case in which image data is thinned and read out in the pixel addition mode. As can be seen from FIG. 11, the pixel arrangement of image data read out in the pixel addition mode (FIG. 14C), when compared to the pixel arrangement of the image sensor (FIG. 14A), not only differs from the thinned and read-out pixel arrangement but also shows a shift in the center of gravity due to addition (see FIG. 14B). As a result, if magnification chromatic aberration correction is carried out on the image data that is read out in the pixel addition mode without taking into consideration this difference in position of the pixel arrangements, the image quality deteriorates due to correction.

SUMMARY OF THE INVENTION

The present invention has been made in consideration of the above situation, and reduces image quality degradation due to carrying out magnification chromatic aberration correction on image data read out from an image sensor by carrying out thinning or addition.

According to one aspect of the present invention, there is provided an image sensing apparatus comprising: an image sensor that converts an image formed by an optical system into electrical signals at each of a plurality of pixels; a driving unit that drives the image sensor so as to output the electrical signals through a plurality of readout modes including at least a full pixel readout mode that reads out respective electrical signals from all of the plurality of pixels and a thinning readout mode that reads out respective electrical signals from pixels that exclude at least a portion of the pixels of the plurality of pixels; an acquisition unit that acquires optical system magnification chromatic aberration correction information; a correction coefficient calculation unit that, using the acquired magnification chromatic aberration correction information, obtains a coefficient for a first magnification chromatic aberration correction method in a case in which the electrical signals are read out using the full pixel readout mode, and obtains a coefficient for a second magnification chromatic aberration correction method in a case in which the electrical signals are read out using the thinning readout mode; and a chromatic aberration correction unit that corrects the electrical signals using a coefficient obtained by the correction coefficient calculation unit, wherein, in the first magnification chromatic aberration correction method, the read-out electrical signals are corrected based on pixel positions that the electrical signals indicate, and in the second magnification chromatic aberration correction method, the thinned and read-out electrical signals are corrected based on positions in the image sensor of pixels that correspond to the electrical signals.

According to another aspect of the present invention, there is provided an image sensing apparatus comprising: an image sensor that converts an image formed by an optical system into electrical signals at each of a plurality of pixels; a driving unit that drives the image sensor so as to output the electrical signals through a full pixel readout mode that reads out respective electrical signals from all of the plurality of pixels and a mode other than the full pixel readout mode; and a chromatic aberration correction unit that corrects the electrical signals in a case in which the electrical signals are read out using the full pixel readout mode, and does not correct the electrical signals in a case in which the electrical signals are read out in a readout mode other than the full pixel readout mode.

According to still another aspect of the present invention, there is provided a correction method that performs magnification chromatic aberration correction on electrical signals read out through one of a plurality of readout modes that includes at least a full pixel readout mode that reads out respective electrical signals from all of a plurality of pixels and a thinning readout mode that reads out respective electrical signals from pixels that exclude at least a portion of the pixels of the plurality of pixels from an image sensor that converts an image formed by an optical system into the electrical signals at each of the plurality of pixels, the method comprising: an acquisition step of acquiring optical system magnification chromatic aberration correction information; a correction coefficient calculation step of, using the acquired magnification chromatic aberration correction information, obtaining a coefficient for a first magnification chromatic aberration correction method in a case in which the electrical signals are read out using the full pixel readout mode, and obtaining a coefficient for a second magnification chromatic aberration correction method in a case in which the electrical signals are read out using the thinning readout mode; and a chromatic aberration correction step of correcting the electrical signals using a coefficient obtained by the correction coefficient calculation unit, wherein, in the first magnification chromatic aberration correction method, the read-out electrical signals are corrected based on pixel positions that the electrical signals indicate, and in the second magnification chromatic aberration correction method, the thinned and read-out electrical signals are corrected based on positions in the image sensor of pixels that correspond to the electrical signals.

According to yet another aspect of the present invention, there is provided a correction method that performs magnification chromatic aberration correction on electrical signals read out through one of a full pixel readout mode that reads out respective electrical signals from all of a plurality of pixels and a mode other than the full pixel readout mode from an image sensor that converts an image formed by an optical system into the electrical signals at each of the plurality of pixels, the method comprising: a chromatic aberration correction step of correcting the electrical signals in a case in which the electrical signals are read out using the full pixel readout mode, and not correcting the electrical signals in a case in which the electrical signals are read out in a readout mode other than the full pixel readout mode.

Further features of the present invention will become apparent from the following description of exemplary embodiments (with reference to the attached drawings).

BRIEF DESCRIPTION OF THE DRAWINGS

FIGS. 4A-4C are schematic diagrams for the purpose of illustrating changes in pixel position during thinning readout according to the first embodiment of the present invention;

FIGS. 6A and 6B are schematic diagrams for the purpose of illustrating the magnification chromatic aberration correction process during addition readout of R pixels according to the first embodiment of the present invention;

FIGS. 7A-7C are schematic diagrams illustrating centers of gravity of the R pixels during addition readout according to first embodiment of the present invention;

FIGS. 8A and 8B are schematic diagrams for the purpose of illustrating changes in pixel position of B pixels during addition readout according to the first embodiment of the present invention;

FIGS. 9A-9C are schematic diagrams for the purpose of illustrating magnification chromatic aberration correction processing of the B pixels during addition readout according to the first embodiment of the present invention;

FIGS. 14A-14C are schematic diagrams for illustrating changes in pixel position during conventional thinning and addition readout.

DESCRIPTION OF THE EMBODIMENTS

Embodiments of the present invention will be described in detail in accordance with the accompanying drawings.

First Embodiment

Figure 1:
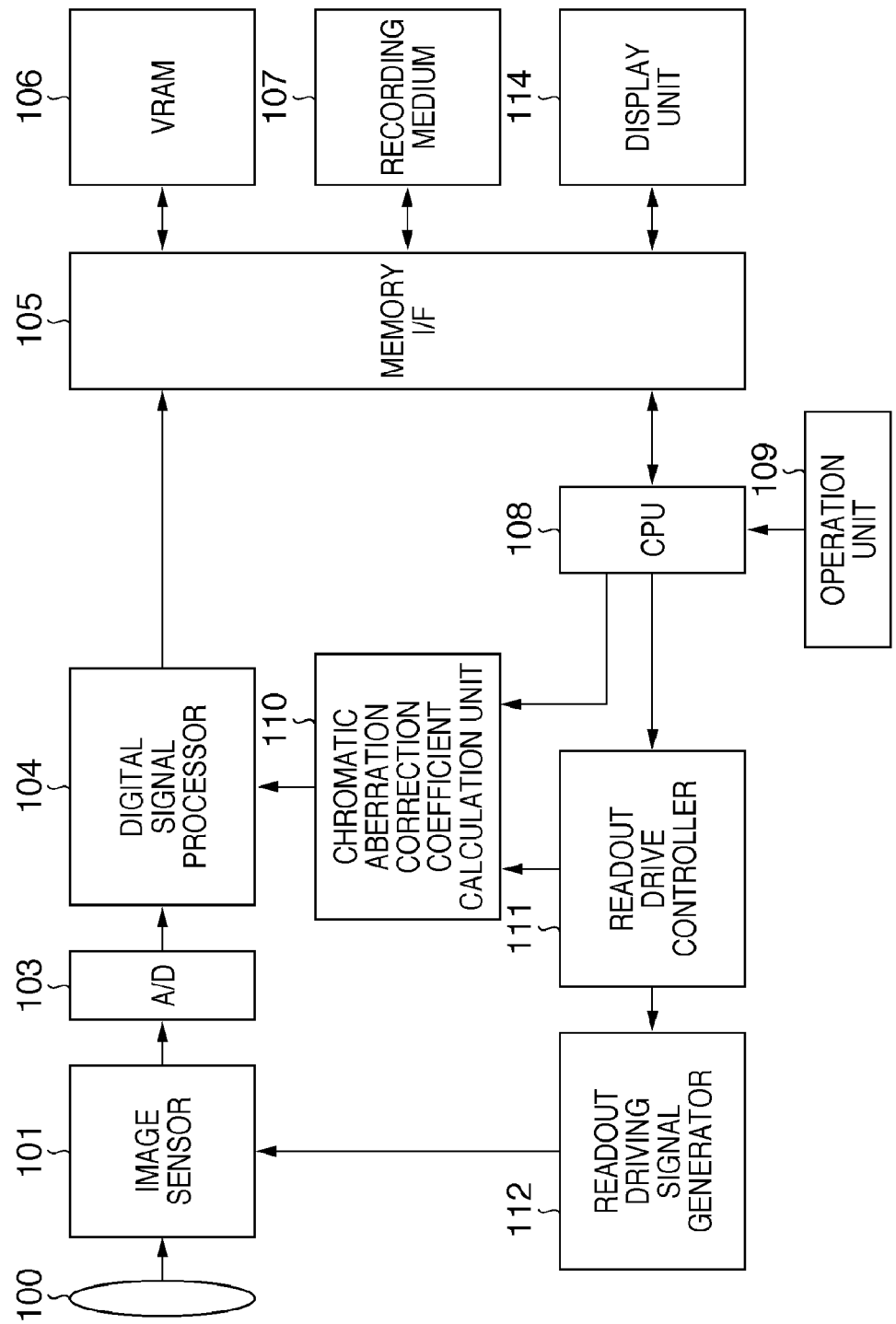
FIG. 1 is a block diagram illustrating a schematic configuration of an image sensing apparatus according to a first embodiment of the present invention.

FIG. 1 is a block diagram illustrating a schematic configuration of an image sensing apparatus according to a first embodiment of the present invention.

In the configuration shown in FIG. 1, an optical image of an object that is passed through a lens 100 (optical system) and formed on an image sensor 101 is converted into electrical signals by the image sensor 101 having a plurality of pixels. An A/D converter 103 converts the electrical signals output from the image sensor 101 into digital signals. At a digital signal processor 104, the digital signals output from the A/D converter 103 are converted into luminance signal and color difference signal image data. It is to be noted that the digital signal processor 104 also carries out magnification chromatic aberration correction processing of color deviation due to chromatic aberration caused by the lens 100. In addition, a white balance (WB) circuit, a λ correction circuit, a matrix conversion circuit and the like are also included in the digital signal processor 104 for the purpose of conversion to image data (hereinafter "development processing").

A memory I/F 105 records image data from the digital signal processor 104 to a VRAM 106 and a recording medium 107. A display unit 114 displays images read out from the VRAM 106 through the memory I/F 105.

An operation unit 109 is used to input setting information by mechanical control of buttons or the like, and based on setting information thus input, a CPU 108 sends control signals to a readout drive controller 111 and a chromatic aberration correction coefficient calculation unit 110. Based on the control signals from the CPU 108, the readout drive controller 111 sends driving control information to a driving signal generator 112. The driving signal generator 112 generates driving signals based on the driving control information and sends the generated driving signals to the image sensor 101. The image sensor 101, based on the driving signals, switches the way it reads out the electrical signals among several types of readout modes. As readout modes there are, for example, a full pixel readout mode that reads out respective electrical signals from all of a plurality of pixels, and a thinning readout mode that reads out respective electrical signals from the pixels except for at least a portion of the plurality of pixels. In addition, there is an addition readout mode that adds together and reads out electrical signals from each of a predetermined number of pixels out of the plurality of pixels.

In addition, the readout drive controller 111 also sends readout driving information to the chromatic aberration correction coefficient calculation unit 110. Based on this readout driving information, the chromatic aberration correction coefficient calculation unit 110 switches the chromatic aberration correction processing method and sends a chromatic aberration correction coefficient obtained in a manner to be described later to a magnification chromatic aberration correction circuit inside the digital signal processor 104.

Figure 2:
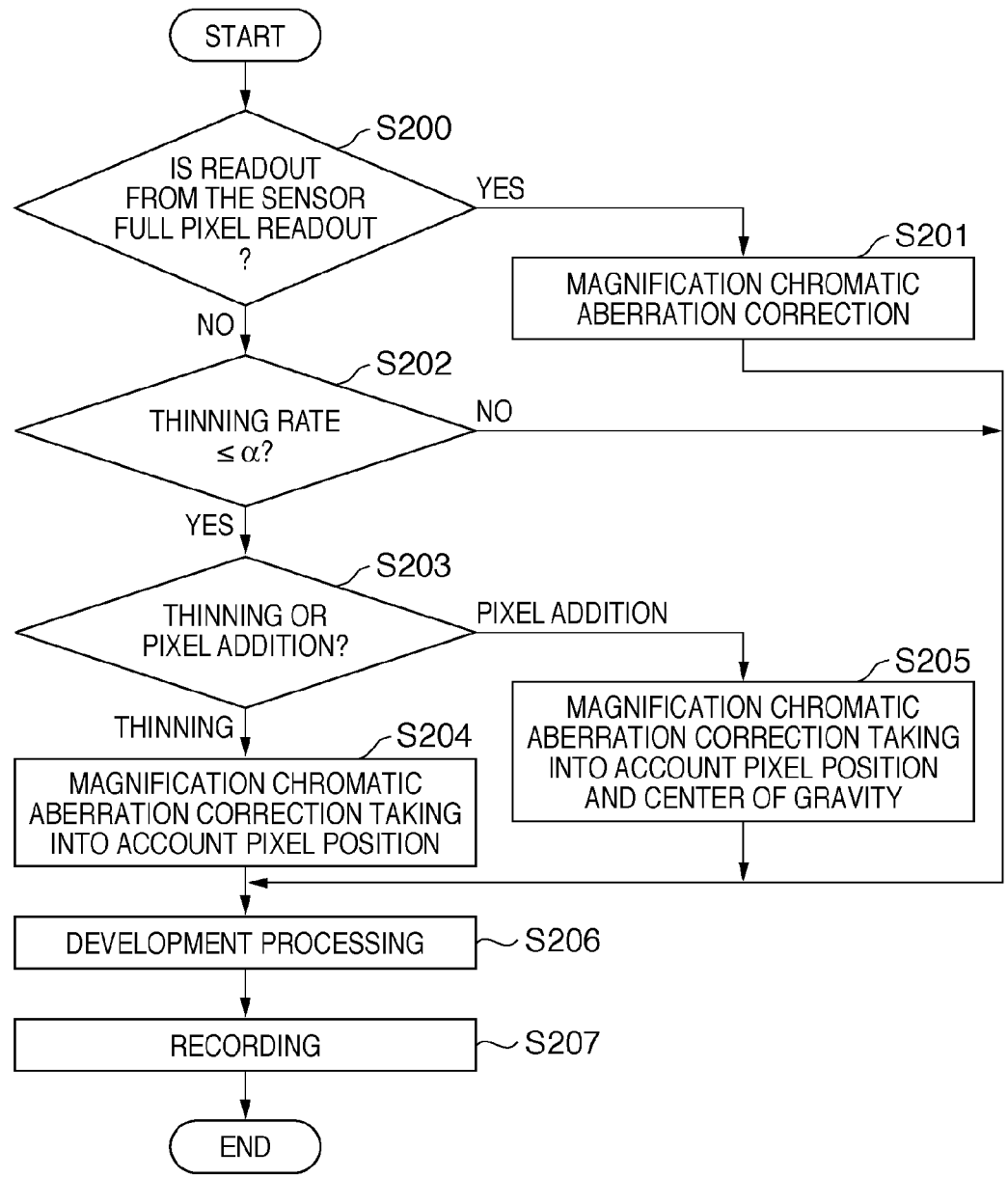
FIG. 2 is a flowchart illustrating a process of switching magnification chromatic aberration correction according to the first embodiment of the present invention.

Next, a description is given of the process of switching the chromatic aberration correction processing method according to the first embodiment in an image sensing apparatus having the configuration described above, with reference to the flowchart shown in FIG. 2.

The processing shown in FIG. 2 is carried out when a start of recording is instructed through a release button or the like during still image sensing or moving image sensing.

First, in step S200, the chromatic aberration correction coefficient calculation unit 110, based on the driving control information from the readout drive controller 111, determines whether or not readout of the image sensor 101 is full pixel readout, and if it is full pixel readout, processing proceeds to step S201.

In step S201, because it is full pixel readout, the chromatic aberration correction coefficient calculation unit 110 outputs to the digital signal processor 104 a chromatic aberration correction coefficient for normal magnification chromatic aberration correction processing (hereinafter "first magnification chromatic aberration correction"). Then, at the digital signal processor 104 magnification chromatic aberration correction is carried out using the chromatic aberration correction coefficient thus obtained. Development processing is carried out on the image data after the image data has been subjected to magnification chromatic aberration correction (step S206). It is to be noted that a detailed description of the first magnification chromatic aberration correction process is given later.

On the other hand, if in step S200 the readout of the image sensor 101 is not full pixel readout, processing proceeds to step S202.

In step S202, the chromatic aberration correction coefficient calculation unit 110 determines whether or not a thinning rate of the readout of the image sensor 101 is at or above a predetermined threshold value α, and if so, either arranges matters so that chromatic aberration does not occur or reports to the digital signal processor 104 a chromatic aberration correction coefficient for which chromatic aberration correction is not carried out.

If in step S202 the thinning rate in the readout of the image sensor is lower than the predetermined threshold value α, the processing proceeds to step S203. At step S203, the chromatic aberration correction coefficient calculation unit 110, based on the driving control information from the readout drive controller 111, identifies whether the readout of the image sensor 101 is thinning readout or pixel addition readout.

If the readout is thinning readout, the processing proceeds to step S204 and magnification chromatic aberration correction that takes into consideration pixel position in the image sensor 101 (hereinafter "second magnification chromatic aberration correction") is carried out. At this point, the chromatic aberration correction coefficient calculation unit 110 obtains by calculation a chromatic aberration correction coefficient for the second magnification chromatic aberration correction and outputs the chromatic aberration correction coefficient thus obtained to the digital signal processor 104. The digital signal processor 104 carries out magnification chromatic aberration correction using the chromatic aberration correction coefficient thus obtained. Development processing is carried out on the image data after the image data has been subjected to magnification chromatic aberration correction (step S206). A detailed description of the method of calculating the chromatic aberration correction coefficient in the second magnification chromatic aberration correction process is given later.

On the other hand, if in step S203 the readout is identified as pixel addition readout, then the processing proceeds to step S205 and magnification chromatic aberration correction that takes into account pixel position in the image sensor 101 and movement in the centers of gravity due to pixel addition (hereinafter "third magnification chromatic aberration correction") is carried out. At this point, the chromatic aberration correction coefficient calculation unit 110 obtains by calculation a chromatic aberration correction coefficient for the third magnification chromatic aberration correction and outputs the chromatic aberration correction coefficients thus obtained to the digital signal processor 104. The digital signal processor 104 carries out magnification chromatic aberration correction using the chromatic aberration correction coefficient thus obtained. Development processing is carried out on the image data after the image data has been subjected to magnification chromatic aberration correction (step S206). A detailed description of the method of calculating the chromatic aberration correction coefficient in the third magnification chromatic aberration correction process is given later.

By thus switching the magnification chromatic aberration correction method depending on the way of the readout of the image sensor 101 in a case in which the thinning rate of the readout of the image sensor 101 is lower than the predetermined threshold value α, image quality degradation due to correction can be prevented.

In step S207, the developed image data is recorded on the recording medium 107 through the memory I/F 105.

Next, a description is given of each of the methods of calculating the chromatic aberration correction coefficient in the first through third magnification chromatic aberration correction processes.

First Magnification Chromatic Aberration Correction

With respect to the first magnification chromatic aberration correction, as described above a number of techniques have been disclosed, one example of which is used here in this description.

Figure 3:
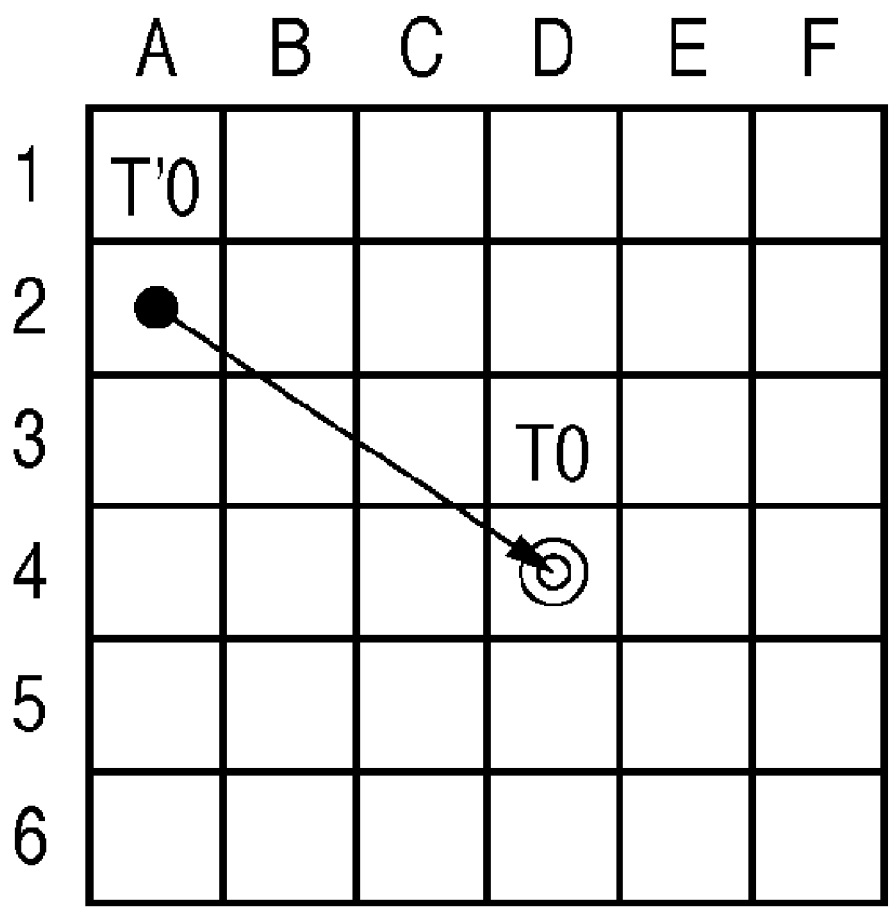
FIG. 3 is a schematic diagram illustrating a magnification chromatic aberration correction method according to the first embodiment of the present invention.

FIG. 3 shows a portion of a pixel arrangement of an image sensor, in which letters and numbers indicate coordinate positions of the pixels.

In this case, assume that, due to the chromatic aberration of the lens 100, a pixel T0 at coordinates D-4 in FIG. 3 requires color information of a pixel T'0 positioned at A-2. In order to acquire the color information of this pixel T'0, the chromatic aberration correction coefficient calculation unit 110 obtains the pixel position (in this example, A-2) for which color information is to be obtained from previously stored chromatic aberration information of the lens 100 and from the pixel position of the obtained image (in this example, D-4). Then, the magnification chromatic aberration correction circuit of the digital signal processor 104 carries out chromatic aberration correction by recording the color information of the pixel for which color information is to be obtained at the thus-obtained pixel position (hereinafter "target pixel") as the color information for the original pixel position (D-4). It is to be noted that when the target color information is missing from the target pixel, the color information of the target pixel is obtained by carrying out interpolation using a weighted average of nearby pixels of the same color.

Second Magnification Chromatic Aberration Correction

Next, a description is given of the method of calculating the chromatic aberration correction coefficient of the second magnification chromatic aberration correction during thinning readout in step S204.

Figures 4A, 4B, 4C:
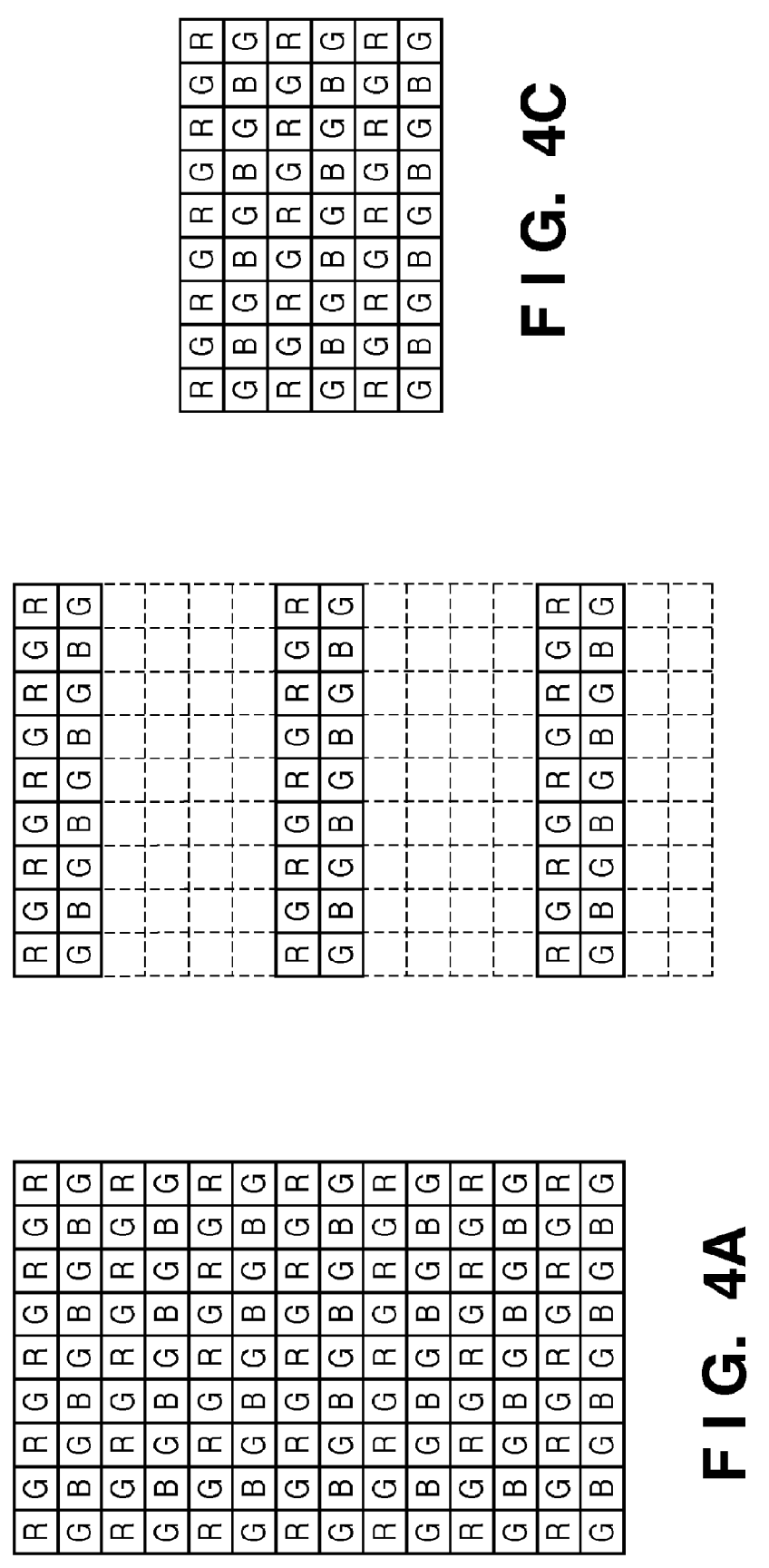

FIG. 4A shows the pixel arrangement of the image sensor 101. The image data obtained by vertical thinning as shown in FIG. 4B becomes the pixel arrangement data shown in FIG. 4C, in which four lines of pixel information between the data is missing. As such, the coordinate system of the image data and the coordinate system of the image sensor 101 do not match. Therefore, if correction like that shown in FIG. 3 is carried out on the pixel arrangement of the image data shown in FIG. 4C, image data for pixel Q1 in FIG. 5B in the pixel arrangement of the image sensor 101 is recorded at pixel P0 in FIG. 5A.

Figure 5A:
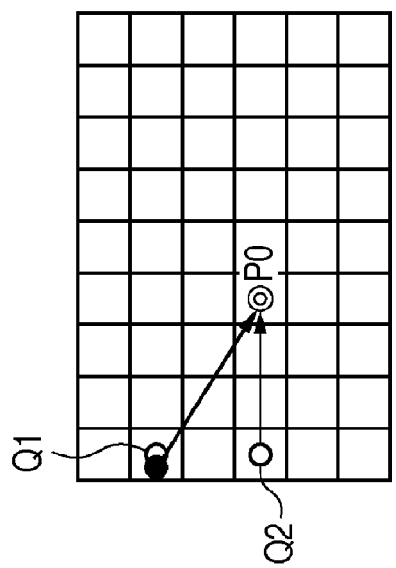
FIGS. 5A and 5B are schematic diagrams for the purpose of illustrating magnification chromatic aberration correction processing during thinning readout according to the first embodiment of the present invention.
Figure 5B:
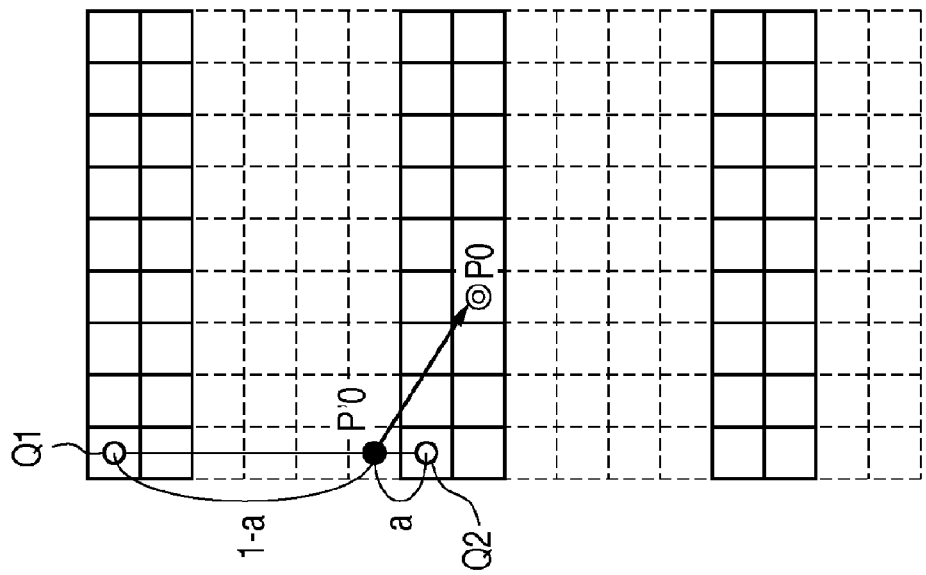

In the case of thinning readout as shown here, as shown in FIG. 5B it is necessary to make P'0 the target pixel of chromatic aberration correction for pixel P0. It is to be noted that the pixel arrangement shown in FIG. 5A corresponds to the pixel arrangement shown in FIG. 4C, and the pixel arrangement shown in FIG. 5B corresponds to the pixel arrangement shown in FIG. 4B.

Accordingly, when carrying out the second magnification chromatic aberration correction, the chromatic aberration correction coefficient calculation unit 110, as shown in FIG. 5B, obtains the position of the target pixel in the coordinate system of the image sensor 101 and obtains the position of the image data that corresponds to that pixel position (the position in FIG. 5A). It is to be noted that, in a case in which the target pixel obtained with the coordinate system of the image sensor 101 does not contain color information for the pixel P0 that is to be subjected to chromatic aberration correction, at least two adjacent pixels of the same color that have not been thinned are identified and a coefficient to be applied to the image data of the adjacent pixels is obtained based on the distance between the target pixel position and the adjacent pixels. In the examples shown in FIGS. 5A and 5B, pixel Q1 and pixel Q2 and coefficient (1-a) and coefficient a are obtained as the chromatic aberration correction coefficients for pixel P0. In a case in which the target that is obtained with the coordinate system of the image sensor 101 has the same color information as the pixel P0 that is to be subjected to chromatic aberration correction, the coefficient is 1.

The chromatic aberration correction coefficient calculation unit 110 outputs to the digital signal processor 104 the positions of the obtained pixels Q1, Q2 in the pixel arrangement shown in FIG. 5A and the coefficients (1-a) and a. The digital signal processor 104, based on this information, carries out magnification chromatic aberration correction.

Thus, it is possible to carry out image correction without the occurrence of image degradation due to correction even in magnification chromatic aberration correction during thinning readout.

Third Magnification Chromatic Aberration Correction

Next, a description is given of the method of calculating the chromatic aberration correction coefficient in the third magnification chromatic aberration correction during pixel addition readout in step S205.

FIGS. 6A and 6B show an example of pixel addition of a 12×12 section of pixels in a Bayer arrangement in the image sensor 101. Concentrating on the red (R) pixels, it can be seen that, in the arrangement shown in FIG. 6A, the addition pixel data R1 output from the image sensor 101 is obtained by adding together pixel data of 9 pixels, r1, r2, r3, r4, r5, r6, r7, r8, and r9. Accordingly, four pixels of R pixel data as shown in FIG. 6B are obtained from RGB image data of a 4×4 section of pixels obtained by pixel addition from the image sensor 101 shown in FIG. 6A.

FIG. 7A shows the centers of gravity in the pixel arrangement of the image sensor 101 of addition pixel data R1 through R4 obtained from the image sensor 101. The angle of view of the addition pixel data output from the 12×12 pixels of the image sensor 101 shown in the example (4×4 pixels, see also FIG. 6B) is unchanged from the angle of view of the 12×12 pixels prior to addition. Therefore, when enlarged to match the angle of view of the data shown in FIG. 6B, the centers of gravity r1 through r4 of the pixels of the output image data become as shown in FIG. 7B.

At this point, when the actual centers of gravity of the addition pixels in the pixel arrangement of the image sensor 101 (FIG. 7A) and the centers of gravity of the enlarged output image data (FIG. 7B) are superimposed on each other, the relation shown in FIG. 7C is obtained.

As can be seen from FIG. 7C, there is deviation between the actual centers of gravity R1-R4 in the pixel arrangement of the image sensor 101 and the enlarged output image data centers of gravity r1-r4 (vector x in FIG. 7C).

Accordingly, when carrying out third magnification chromatic aberration correction, it is necessary for the chromatic aberration correction coefficient calculation unit 110 to carry out magnification chromatic aberration correction while taking into account this deviation in position of the centers of gravity. For example, consider a case in which the position of the target pixel for magnification chromatic aberration correction of pixel position r4 in FIG. 7B is pixel position R'0. Originally, the image data for pixel position R'0 is acquired by weighted addition by the distance to each of the pixels of R1, R2, R3, and R4 image data, however, as can be seen from FIG. 7C, the distances from R'0 to R1-R4 and the distances from R'0 to r1-r4 are different. Therefore, if weighted addition according to the distances to r1-r4 is carried out, not the image data for the R'0 pixel position but in fact the image data for the position of R0 becomes the target pixel image data.

Thus, in the third magnification chromatic aberration correction, using chromatic aberration correction information, first, the position information to the target pixel R'0 for the pixel position r4 (vector y) is read out. Then, the value for R'0 in the coordinates of the image sensor 101 at the position of the vector y is obtained from R1, R2, R3, and R4. At this point, if vectors d1-d4 indicate distance and direction from R'0 to r1-r4, then vectors D1-D4 indicating distance and direction from R'0 to R1-R4 are d1-x, d2-x, d3-x, and d4-x, respectively. The value for R'0 can be obtained from the sizes (scalars) of the vectors D1-D4 obtained in this way with a weighted average using formula (1):

$$R'0=(|D1|\cdot R1+|D2|\cdot R2+|D3|\cdot R3+|D4|\cdot R4)/(|D1|+|D2|+|D3|+|D4|) \qquad (1)$$

Obtaining the pixel value of the target pixel R'0 for the pixel position at r4 in the output image data as described above makes it possible to carry out chromatic aberration correction that takes into account deviation in the centers of gravity due to pixel addition.

The chromatic aberration correction coefficient calculation unit 110 outputs to the digital signal processor 104 the positions in the pixel arrangement shown in FIG. 6B of the pixels R1-R4 obtained as described above and the coefficients |D1| through |D4|. The digital signal processor 104, based on this information, carries out magnification chromatic aberration correction.

For the B pixels also, chromatic aberration correction is carried out in the manner illustrated in FIG. 8A through FIG. 9C in the same way that as has been described with reference to FIG. 6A through FIG. 7C.

That is, addition pixel data B1 is obtained by addition of nine pixels, b1, b2, b3, b4, b5, b6, b7, b8, and b9, of the 12×12 pixels of the Bayer arrangement shown in FIG. 8A. In the same manner, addition pixel data B1-B4 as shown in FIG. 8B is obtained.

FIG. 9A shows the centers of gravity in the pixel arrangement of the image sensor 101 of the addition pixels, and FIG. 9B shows the centers of gravity in a case in which the image data shown in FIG. 8B is enlarged to the angle of view of the 12×12 pixels. Here, B'0 is the target pixel position for magnification chromatic aberration correction for the pixel position b4 of the image sensor 101. In this case, as shown in FIG. 9C, if weighted addition based on the distances from B'0 to b1-b4 is carried out, in fact the image data for the position of B0 becomes the target pixel image data due to deviation in the centers of gravity.

Therefore, it is necessary to carry out magnification chromatic aberration correction that takes into account this deviation (the vector X from B1-B4 to r1-r4). The vectors D'1-D'4 from B'0 to B1-B4 in the image sensor 101 become d'1-X, d'2-X, d'3-X, d'4-X, respectively. The value for B'0 can be obtained from the sizes (scalars) of the vectors D'1-D'4 obtained in this way with a weighted average using formula (2):

$$B'0=(|D'1|\cdot B1+|D'2|\cdot B2+|D'3|\cdot B3+|D'4|\cdot B4)/(|D'1|+|D'2|+|D'3|+|D'4|) \qquad (2)$$

Thus, it is possible to carry out chromatic aberration correction that takes into account deviation in the centers of gravity due to pixel addition by using the value of the pixel position B'0 as the target pixel for pixel B'4 in the output image data.

The chromatic aberration correction coefficient calculation unit 110 outputs to the digital signal processor 104 the positions in the pixel arrangement shown in FIG. 8B of the pixels B1-B4 obtained as described above and the coefficients |D1| through |D4|. The digital signal processor 104, based on this information, carries out magnification chromatic aberration correction.

Thus, for magnification chromatic aberration correction during pixel addition also, it is possible to carry out image correction without the occurrence of image degradation due to correction by taking into account deviation in the centers of gravity due to pixel addition.

Next, a description is given of the thinning rate and the threshold value α.

The more pixel information missing due to thinning, the greater the distance between pixels of the image data obtained. As a result, even though the image information that is to be corrected during magnification chromatic aberration correction is obtained by interpolation it is still widely spaced image information, and consequently image degradation due to correction occurs even though magnification chromatic aberration correction is carried out.

Accordingly, by setting a threshold value α and not carrying out magnification chromatic aberration correction when the thinning rate is greater than the threshold value α, image degradation due to correction can be prevented.

Considering only the vertical direction, for example, the thinning rate is expressed as the number of thinned lines/the total number of lines. If the threshold value α is set at 10%, then the thinning rate in the case of a total of 3000 lines, for example, is (300/3000)×100=10%, and matches the threshold value 10% at 300 lines.

Therefore, because the thinning rate exceeds the threshold value α when the number of thinned lines is more than 300, magnification chromatic aberration correction processing is not carried out, and when the number of thin lines is less than 300, magnification chromatic aberration correction processing is carried out.

Figure 10:
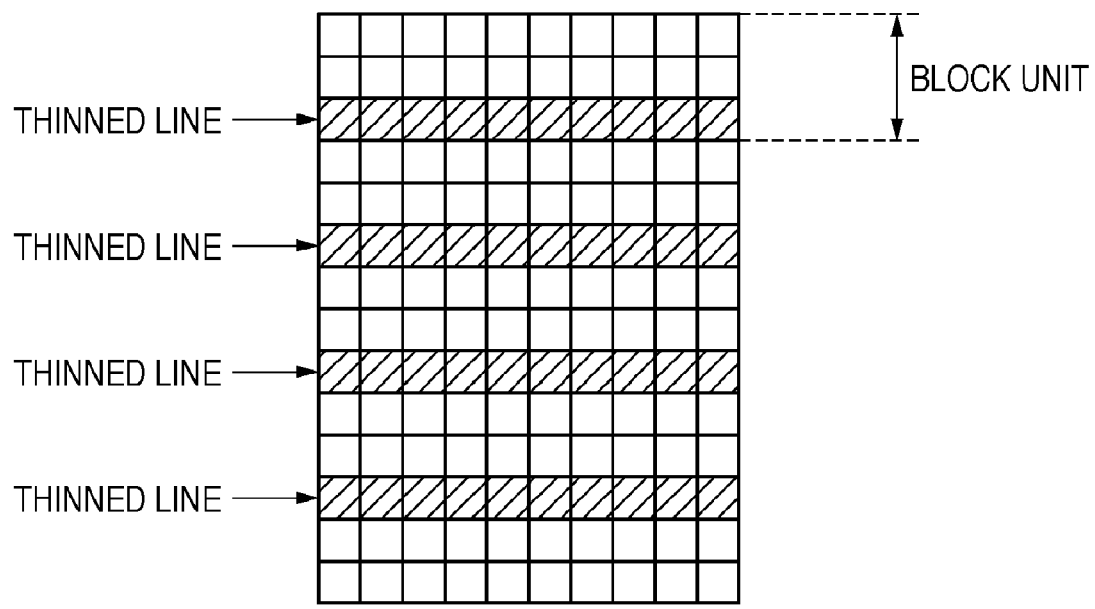
FIG. 10 is a schematic diagram for the purpose of illustrating a threshold value according to the first embodiment of the present invention.

In addition, as shown in FIG. 10, the number of thinned lines/the number of readout lines in units of blocks may be made the thinning rate, and compared with the threshold value α.

Figure 11:
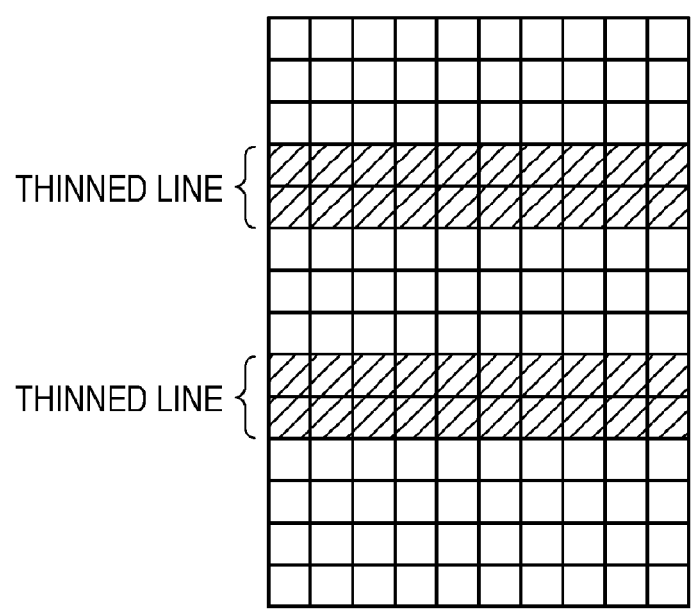
FIG. 11 is a schematic diagram for the purpose of illustrating another threshold value according to the first embodiment of the present invention.

Further, as shown in FIG. 11, the number of consecutive thinned lines may be compared as is with the threshold value α. In this case, when for example the threshold value α=2, if the number of consecutive thinned lines is 3 magnification chromatic aberration correction is not carried out, whereas if the number of consecutive thinned lines is 1 magnification chromatic aberration correction is carried out.

In either of the cases described above, in the horizontal direction as well the thinning rate is similarly obtained in units of pixels and compared with the threshold value α. Here, the threshold value may be set separately for the vertical direction and for the horizontal direction.

According to the first embodiment of the present invention as described above, in cases in which readout from the image sensor is in modes such as the thinning readout mode or the pixel addition mode, by changing magnification chromatic aberration correction processing depending on the readout mode image quality degradation due to correction can be prevented.

It is to be noted that although in the first embodiment described above magnification chromatic aberration correction processing is carried out on image data read out by thinning reading or addition reading, the invention of the present application is not limited thereto, and in a case in which both thinning and addition are carried out and the image data is read out, coefficients may be obtained taking into account changes in the centers of gravity of the pixels due to thinning of pixels shown in FIG. 4A through FIG. 5B and pixel addition shown in FIG. 6A through FIG. 9C.

Second Embodiment

Next, a description is given of a second embodiment of the present invention.

Figure 12:
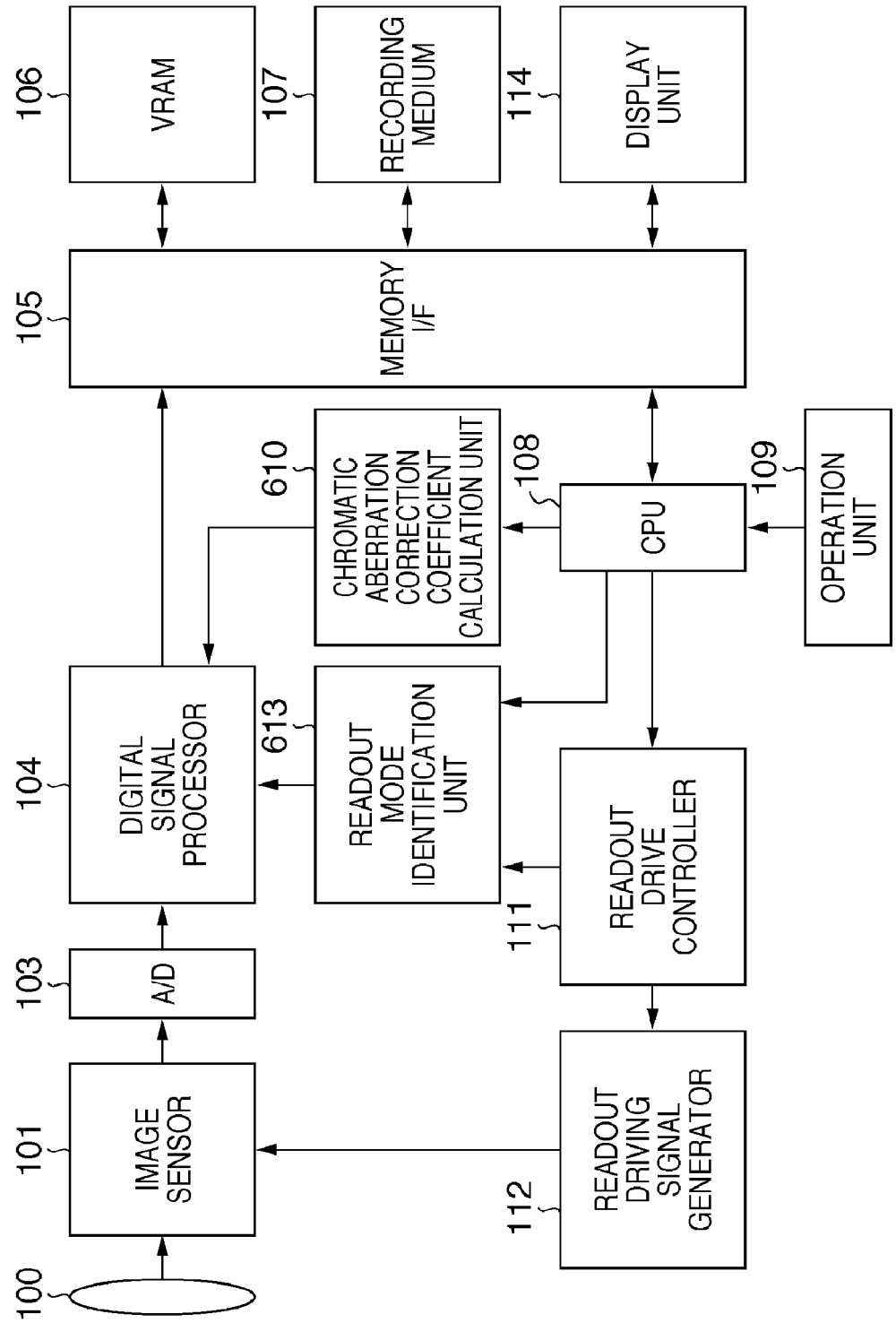
FIG. 12 is a block diagram illustrating a schematic configuration of an image sensing apparatus according to a second embodiment of the present invention.

FIG. 12 is a block diagram illustrating a schematic configuration of an image sensing apparatus in a second embodiment of the present invention. In FIG. 12, components identical to those shown in FIG. 1 are given identical reference numerals and descriptions thereof omitted. Compared to the configuration shown in FIG. 1, the configuration shown in FIG. 12 differs in that, in addition to the further addition of a readout mode identification unit 613, the processing in a chromatic aberration correction coefficient calculation unit 610 is different from the processing performed by the chromatic aberration correction coefficient calculation unit 110 of the first embodiment.

In the present second embodiment, based on setting information input from the operation unit 109, the CPU 108 sends control signals also to the readout mode identification unit 613 in addition to the readout drive controller 111 and the chromatic aberration correction coefficient calculation unit 610. The readout drive controller 111, based on the control signals from the CPU 108, sends readout driving information to the chromatic aberration correction coefficient calculation unit 610 and to the readout mode identification unit 613.

The chromatic aberration correction coefficient calculation unit 610 obtains the chromatic aberration correction coefficient based on prerecorded lens chromatic aberration correction information and read-out pixel position information, and sends the coefficient to the digital signal processor 104.

The readout mode identification unit 613, based on the readout driving information, determines whether or not the image sensor 101 readout is the full pixel readout mode or a readout mode other than the full pixel readout mode, and sends a correction ON/OFF control signal to the digital signal processor 104.

Figure 13:
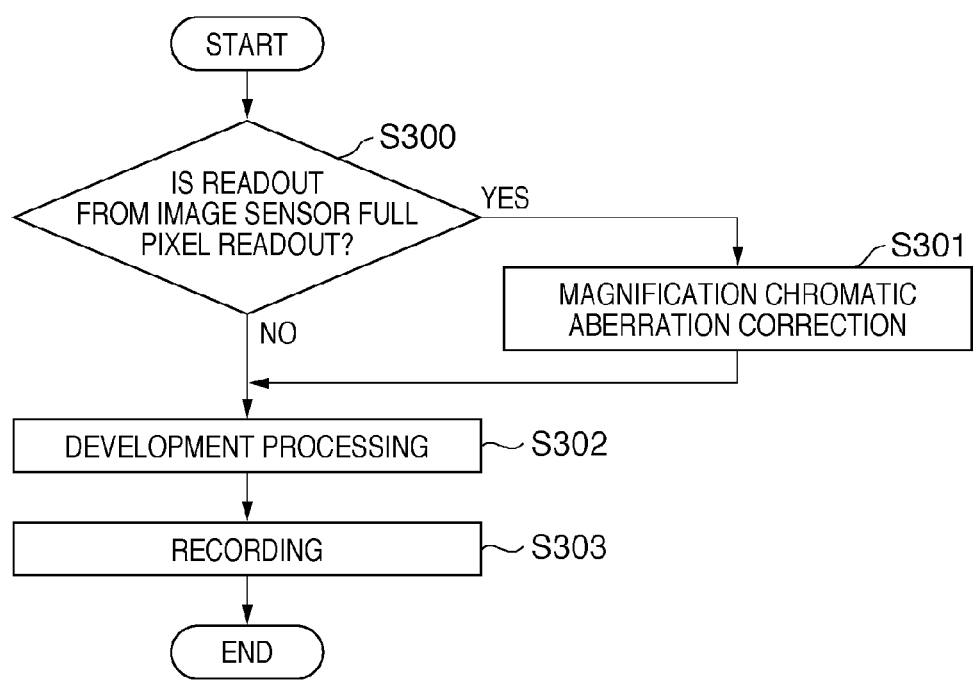
FIG. 13 is a flowchart illustrating a process of switching magnification chromatic aberration correction according to the second embodiment of the present invention.

A description is now given of ON/OFF switching of the chromatic aberration correction processing method in the readout mode identification unit 613, with reference to the flowchart shown in FIG. 13.

FIG. 13 takes as the start a point in time at which the start of recording is carried out by the release button or the like during still image sensing and moving image sensing.

First, in step S300, based on the readout driving information from the readout drive controller 111, it is determined whether or not the image sensor 101 readout mode is the full pixel readout mode, and if it is the full pixel readout mode, processing proceeds to step S301.

In step S301, because all pixels are being read out, normal magnification chromatic aberration correction processing (first magnification chromatic aberration correction) is carried out and the processing proceeds to step S302.

On the other hand, if in step S300 the image sensor 101 readout mode is not the full pixel readout mode (when the readout mode is something other than the full pixel readout mode), the processing proceeds to step S302.

In step S302, the image data is subjected to development processing. In step S303, the developed image data is recorded to the recording medium 107.

Thus, normal magnification chromatic aberration correction processing is carried out in a case in which the sensor readout is full pixel readout, but magnification chromatic aberration correction is not carried out when the sensor readout is not a full pixel readout (for example, a mode such as thinning or the like), and therefore image quality degradation due to correction can be prevented.

Thus, according to the second embodiment described above, by turning the magnification chromatic aberration correction processing on and off depending on the way the sensor is read out, image quality degradation due to magnification chromatic aberration correction during thinning readout can be prevented even without a mechanism for switching the magnification chromatic aberration correction processing method.

Other Embodiments

By recording lens chromatic aberration information and readout mode information together with image data, based on this information, the object of the present invention can also be achieved as is described below.

First, a storage medium (or a recording medium) on which is recorded software program code that implements the functions of the embodiments described above is supplied to a system or an apparatus. Then, a computer (or CPU or MPU) of the system or apparatus reads out and executes the program code stored on the storage medium. In this case, the program code read from the storage medium itself implements the functions of the embodiments described above, and the storage medium on which the program code is stored constitutes the present invention.

In addition, the functions of the embodiments described above can also be achieved not by executing program code read out by a computer but as follows. That is, an operating system (OS) or the like running on a computer may carry out the actual processing in part or in whole based on instructions of the read-out program code, with the functions of the embodiments described above implemented by that processing. Examples of storage media that can be used for storing the program code include magnetic storage media such as a floppy disk, a hard disk, a ROM, a RAM, magnetic tape, a non-volatile memory card, a CD-ROM, a CD-R, a DVD, an optical disk, an optical/magnetic disk, an MO or the like. In addition, a computer network such as a LAN (Local Area Network), a WAN (Wide Area Network) or the like can be used to supply the program code.

While the present invention has been described with reference to exemplary embodiments, it is to be understood that the invention is not limited to the disclosed in exemplary embodiments. The scope of the following claims is to be accorded the broadest interpretation so as to encompass all such modifications and equivalent structures and functions.

This application claims the benefit of Japanese Patent Application No. 2008-146218, filed on Jun. 3, 2008, which is hereby incorporated by reference herein in its entirety.

What is claimed is:

1. An image sensing apparatus comprising:
an image sensor that converts an image formed by an optical system into electrical signals at each of a plurality of pixels;
a driving unit that drives the image sensor so as to output the electrical signals through a plurality of readout modes including at least a full pixel readout mode that reads out respective electrical signals from all of the plurality of pixels and a thinning readout mode that reads out respective electrical signals from pixels that exclude at least a portion of the pixels of the plurality of pixels;
an acquisition unit that acquires optical system magnification chromatic aberration correction information;
a correction coefficient calculation unit that, using the acquired magnification chromatic aberration correction information, obtains a coefficient for a first magnification chromatic aberration correction method in a case in which the electrical signals are read out using the full pixel readout mode, and obtains a coefficient for a second magnification chromatic aberration correction method in a case in which the electrical signals are read out using the thinning readout mode; and a chromatic aberration correction unit that corrects the electrical signals using a coefficient obtained by the correction coefficient calculation unit, wherein, in the first magnification chromatic aberration correction method, the read-out electrical signals are corrected based on pixel positions that the electrical signals indicate, and in the second magnification chromatic aberration correction method, the thinned and read-out electrical signals are corrected based on positions in the image sensor of pixels that correspond to the electrical signals.

2. The image sensing apparatus according to claim 1, wherein the plurality of readout modes further includes an addition readout mode that adds the plurality of pixels at every predetermined number of pixels and reads out electrical signals, the correction coefficient calculation unit obtains a coefficient for a third magnification chromatic aberration correction method using the acquired magnification chromatic aberration correction information in a case in which the electrical signals are read out using the addition readout mode, and in the third magnification chromatic aberration correction method, the electrical signals after addition are corrected based on centers of gravity in the image sensor of a plurality of pixels added together in order to obtain the electrical signals.

3. The image sensing apparatus according to claim 1, wherein the chromatic aberration correction unit does not carry out correction of the read-out electrical signals in a case in which a thinning rate of the thinning readout mode is greater than a predetermined threshold value.

4. A correction method that performs magnification chromatic aberration correction on electrical signals read out through one of a plurality of readout modes that includes at least a full pixel readout mode that reads out respective electrical signals from all of a plurality of pixels and a thinning readout mode that reads out respective electrical signals from pixels that exclude at least a portion of the pixels of the plurality of pixels from an image sensor that converts an image formed by an optical system into the electrical signals at each of the plurality of pixels, the method comprising a processor that performs the following steps:

an acquisition step of acquiring optical system magnification chromatic aberration correction information;

a correction coefficient calculation step of, using the acquired magnification chromatic aberration correction information, obtaining a coefficient for a first magnification chromatic aberration correction method in a case in which the electrical signals are read out using the full pixel readout mode, and obtaining a coefficient for a second magnification chromatic aberration correction method in a case in which the electrical signals are read out using the thinning readout mode; and a chromatic aberration correction step of correcting the electrical signals using a coefficient obtained by the correction coefficient calculation unit, wherein, in the first magnification chromatic aberration correction method, the read-out electrical signals are corrected based on pixel positions that the electrical signals indicate, and in the second magnification chromatic aberration correction method, the thinned and read-out electrical signals are corrected based on positions in the image sensor of pixels that correspond to the electrical signals.

5. The correction method according to claim 4, wherein the plurality of readout modes further includes an addition readout mode that adds the plurality of pixels at every predetermined number of pixels and reads out electrical signals, the correction coefficient calculation step obtains a coefficient for a third magnification chromatic aberration correction method using the acquired magnification chromatic aberration correction information in a case in which the electrical signals are read out using the addition readout mode, and in the third magnification chromatic aberration correction method, the electrical signals after addition are corrected based on centers of gravity in the image sensor of a plurality of pixels added together in order to obtain the electrical signal.

6. The correction method according to claim 4, wherein, correction of the read-out electrical signals is not carried out in the chromatic aberration correction step in a case in which a thinning rate of the thinning readout mode is greater than a predetermined threshold value.

7. A non-transitory computer-readable storing medium storing a program that causes a computer to execute the steps of the correction method according to claim 4.

* * * * *